(12) United States Patent
Hatch et al.

(10) Patent No.: US 8,171,797 B2
(45) Date of Patent: May 8, 2012

(54) SIDEBAND ENERGY RATIO METHOD FOR GEAR MESH FAULT DETECTION

(75) Inventors: Charles Terrance Hatch, Gardnerville, NV (US); Dustin Delany Hess, Minden, NV (US); Adam Anthony Weiss, Minden, NV (US); Summer Woodson, Stateline, NV (US); Matthew Benjamin Kalb, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 90 days.

(21) Appl. No.: 12/888,842

(22) Filed: Sep. 23, 2010

(65) Prior Publication Data

US 2012/0073364 A1    Mar. 29, 2012

(51) Int. Cl.
*G01M 13/02* (2006.01)
*G01N 29/48* (2006.01)
*G01N 29/14* (2006.01)

(52) U.S. Cl. .............. 73/587; 73/593; 702/34
(58) Field of Classification Search .......... 73/579, 73/593, 587, 162; 702/34, FOR. 126, FOR. 168
See application file for complete search history.

(56) References Cited

U.S. PATENT DOCUMENTS

| | | | |
|---|---|---|---|
| 3,758,758 A | 9/1973 | Games et al. | |
| 4,777,605 A * | 10/1988 | Pilkington | 702/77 |
| 4,931,949 A * | 6/1990 | Hernandez et al. | 73/162 X |
| 5,804,726 A | 9/1998 | Geib et al. | |
| 6,484,109 B1 | 11/2002 | Lofall | |
| 2005/0096873 A1 | 5/2005 | Klein | |
| 2009/0292505 A1 | 11/2009 | Van Dyke et al. | |
| 2012/0025526 A1 * | 2/2012 | Luo et al. | 702/34 X |

OTHER PUBLICATIONS

Freeman et al., "Signal Analysis Techniques to Identify Axle Build Errors", NOISE-CON, Jul. 28-30, 2008, 5 pages.
Lebold et al., "Review of Vibration Analysis Methods for Gearbox Diagnostics and Prognostics", pp. 623-634, Applied Research Laboratory, The Pennsylvania State University, 2000, presented May 2000.
Keller et al., "Vibration Monitoring of UH-60A Main Transmission Planetary Carrier Fault", American Helicopter Society Forum, May 6-8, 2003, 11 pages.

* cited by examiner

*Primary Examiner* — Thomas P Noland
(74) *Attorney, Agent, or Firm* — Dority & Manning, P.A.

(57) ABSTRACT

Disclosed is a method for assessing deterioration in a gearbox. Data is obtained from an operating gearbox regarding harmonic frequencies and their related sidebands generated as a consequence of the gearbox operation. In a first embodiment, a Sideband Energy Ratio (SER) is calculated by dividing the amplitude of the sum of sideband signals associated with a harmonic to the amplitude of the harmonic. In a second embodiment, a SER is calculated based on sideband amplitudes associated with adjacent harmonics. The ratio may be monitored over time or compared to one or more values to provide an indication of deterioration.

15 Claims, 5 Drawing Sheets

Healthy Gear Mesh

Low (or missing) Sidebands

Damaged Gear Mesh

Higher and/or more sidebands

SIDEBAND ENERGY RATIO METHOD FOR GEAR MESH FAULT DETECTION

FIELD OF THE INVENTION

The present subject matter relates to the evaluation of mechanical component health, and, more specifically, to methodologies for evaluating deterioration from a healthy condition of gearing in a gearbox.

BACKGROUND OF THE INVENTION

As is well known in the art, gear sets in gearboxes can deteriorate over time from a healthy, often new, condition to an unhealthy condition that may result in failure or, at least, inefficient operation of the gearbox. The challenge has been to develop a gearbox condition monitoring system that can provide early indications of impending problems. Prior efforts in this area have established that mesh frequencies and harmonics, by themselves, are usually poor indicators of gear condition. Additionally, variable speed machines, such as wind turbines, can have widely fluctuating loads and speeds, which further complicate gear mesh frequency analysis.

Prior attempts to monitor gears for ongoing deterioration have involved, for example, extracting and trending mesh frequency and harmonic amplitudes. It has been found, however, that this method does not work well as the method has relatively low sensitivity to developing faults. One prior effort along this lines is taught in U.S. Pat. No. 3,758,758 to Games et al., entitled "ROTATIONAL STATISTICAL VIBRATION ANALYSIS EMPLOYING SIDEBANDS AND/OR WEIGHTING."

In view of these known concerns involved with prior efforts to monitor machine health, there remains a need to provide simple analysis methods that have improved sensitivity and lower influence from power and speed variability to accurately evaluate the health of machines, in particular, machines including gearbox systems.

BRIEF DESCRIPTION OF THE INVENTION

Aspects and advantages of the invention will be set forth in part in the following description, or may be obvious from the description, or may be learned through practice of the invention.

The present subject matter relates to a method for assessing deterioration in a machine, in particular, machines including a gearbox. A calculation is made to determine the ratio of summed sideband amplitudes to their center harmonic frequency amplitude produced in an operating machine. The calculated ratio is then evaluated over time and/or compared to a predetermined value.

In alternate embodiments, a ratio is calculated based on the sideband amplitudes of adjacent harmonic frequencies. In a first alternate embodiment, the ratio is calculated using the ratios of sidebands to center harmonic frequency amplitudes of adjacent harmonics. In a second alternate embodiment, the ratio is calculated using the ratios of amplitudes of sidebands associated with adjacent harmonics alone.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
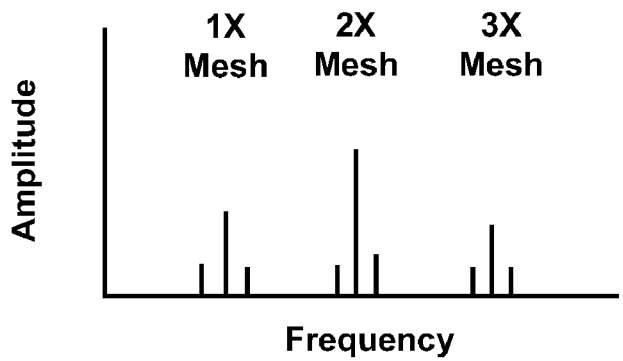
FIG. 1 provides a graphical representation of 1×, 2×, and 3× amplitude vs. frequency waveforms obtained from a test of a healthy gear mesh system.

Repeat use of reference characters throughout the present specification and appended drawings is intended to represent same or analogous features or elements of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As previously noted, the present subject matter is designed to monitor machine health, in particular, gear mesh health, in gearboxes. In the frequency domain, mesh frequencies and their harmonics have been found to be, in general, poor indicators of gearbox deterioration. Typically, sidebands around mesh lines will appear and increase in relative amplitude as damage accumulates, so by including sidebands, anomaly detection can be improved.

Sidebands can result from amplitude or frequency modulation of the gear mesh vibration amplitude by gear defects. Typically, these modulations are related to shaft speeds and harmonics of shaft speeds, but can also be related to other sources. These sources produce characteristic sideband spacing(s) from the center mesh frequency. An algorithm, in accordance with the present subject matter, uses this information to identify specific relevant sidebands.

With variable speed and power machines such as wind turbines, the amplitude of spectral lines can be highly dependent on torque. By calculating a ratio of sideband amplitudes to center mesh frequency amplitude, the present subject matter can reduce this sensitivity to torque and provide a more accurate indication of gear health.

In accordance with the present technology, a Sideband Energy Ratio (SER) has been provided as a useful gear mesh condition indicator that can be monitored over time and compared to one or more alarm levels to provide indications or warnings to equipment operators. In certain instances, alarm levels may be set such that automatic protective actions, such as shutting down power to defective systems, may be put in place.

Figure 2:
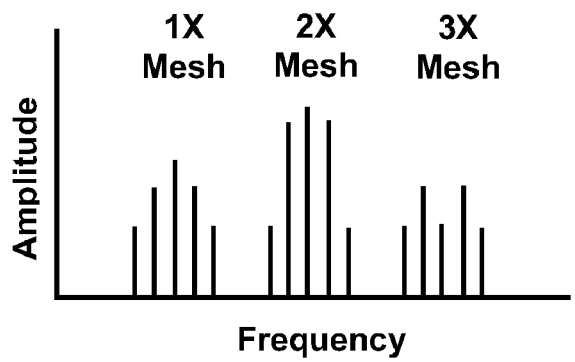
FIG. 2 provides a graphical representation of 1×, 2×, and 3× amplitude vs. frequency waveforms obtained from a damaged gear mesh system.

With respect now to FIG. 1, there is illustrated a graphical representation of 1×, 2×, and 3× amplitude vs. frequency waveforms obtained from a test of a healthy gear mesh system. It is noted that for the present description, the terms 1×, 2×, 3×, etc. are used herein to designate 1× mesh, 2× mesh, 3× mesh, etc. as indicated in FIGS. 1 and 2. As is represented in FIG. 1, there are relatively low or no sidebands present in the operating frequency representation of a healthy gear mesh system.

Referring now to FIG. 2, it will be seen that there is provided a graphical representation of 1×, 2×, and 3× amplitude vs., frequency waveforms obtained from a damaged gear mesh system. As is evident from a comparison of the representative waveforms of FIGS. 1 and 2, a damaged gear mesh system will produce higher and more sidebands at the 1×, 2×, and 3× frequencies than will a healthy system. As is understood, sideband frequencies in general are formed as a result of amplitude or frequency modulation of a center frequency. As deterioration of the gears increases, irregularities form that contribute to the modulation of the center frequency.

Figure 4:
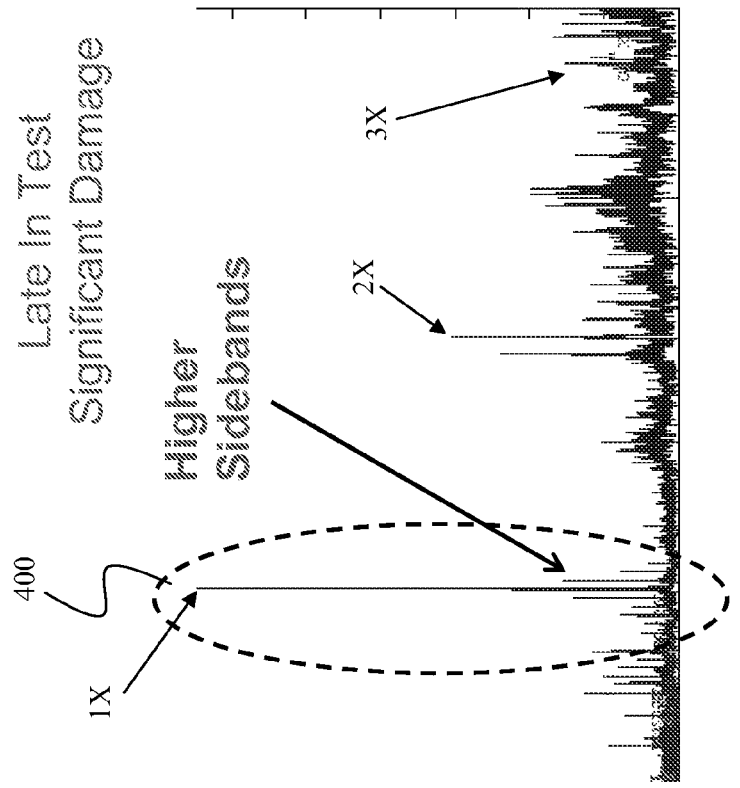
FIG. 4 is a graphical representation of test result from the same test illustrated in FIG. 3, but later in the test.
Figure 3:
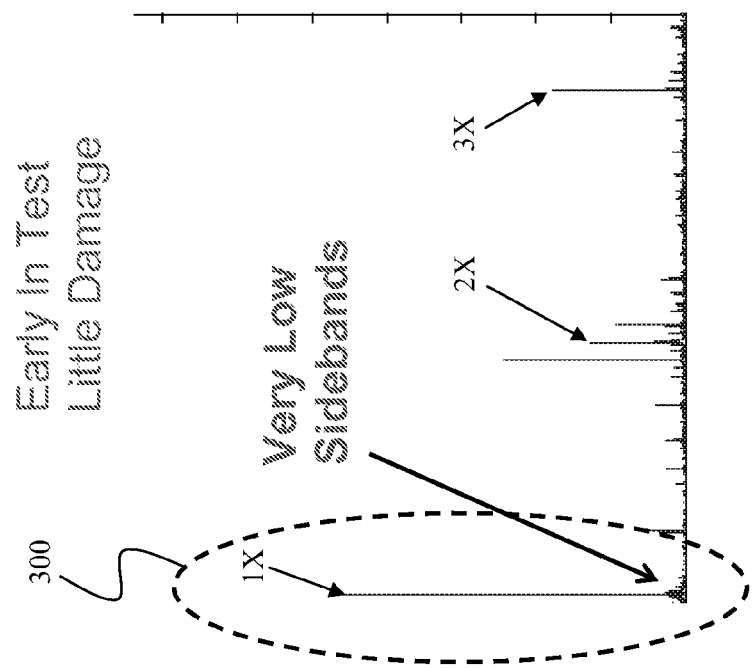
FIG. 3 is a graphical representation of test results obtained early in a test for gearbox deterioration in accordance with present technology.

With reference now to FIGS. 3 and 4, there is illustrated graphical representations of test results obtained early (FIG. 3) and later (FIG. 4) in a test for gearbox deterioration conducted in accordance with present technology. The areas surrounding the 1×, that is, center frequency, delineated by dashed ovals 300 and 400 illustrate readings from the test. As noticed in FIG. 3, in the early stages of the test, there is little gear damage and, consequently, there are very low sidebands.

With respect to FIG. 4 representing test results obtained later in the test, it will be noticed that significant damage in the gears has resulted in higher sidebands being produced as shown generally in oval area 400 surround the 1×, that is center frequency of the gear system.

In accordance with the present subject matter, signal processing of an accelerometer, or other sensor, is performed on a gearbox to arrive at a signal feature or features that are sensitive to the condition of the gear mesh. More specifically, in accordance with present technology, a signal processing method has been developed that will provide improved sensitivity to the kind of changes that happen as a gear set deteriorates. This method is superior to methods that use mesh frequency amplitude alone as it takes into consideration previously unused factors that are produced by the mechanism sought to be monitored, that is, increasing deterioration that signals impending problems in a gearbox.

In accordance with present technology, a new tool, Sideband Energy Ratio (SER), is introduced as an analysis methodology that will take into consideration previously monitored variables, that is, sidebands, but examined in a new way to produce the improved results sought. Typically an algorithm employing this SER methodology will work as illustrated in flow chart 500 of FIG. 5.

At step 502, a waveform derived by monitoring the operation of a gearbox with a transducer is produced. In an exemplary configuration, the transducer may be an accelerometer, but other devices including, for example, a velocity transducer or any suitable sensor that can detect bearing mesh frequencies and harmonics may be used. At step 504, the waveform is subjected to a Fast Fourier Transform (FFT) to produce a frequency spectrum.

At step 506, gearbox mesh frequency data is obtained, and at steps 508 and 510, the spectrum is analyzed, and gear mesh frequency line and harmonic line amplitudes are extracted. Sidebands are detected on both sides, that is, the upper and lower sidebands, of each frequency line, and the sideband amplitudes are extracted. It should be noted, however, that in some instances, summing of just the lower or upper sideband may be employed as each sideband is generally symmetrical around its center frequency. At step 512, sideband amplitudes are summed for the 1× mesh line. It should be appreciated that there may be several sources of sidebands including, without limitation, for a 1× mesh, sidebands spaced at 1× rotor, 2× rotor, 3× rotor, etc. At step 514, the sum of any selected number of these sidebands is then divided by the amplitude of the 1× center mesh line. This ratio is the Sideband Energy Ratio (SER) for the 1× mesh line.

As indicated at step 516, this same process is repeated for each of the 2× and 3× mesh lines to produce, along with the 1× mesh line SER, a unique SER for each mesh line and harmonic of interest.

SERs may then be calculated during the lifetime of the gearbox and gearbox deterioration assessed by comparing the calculated SERs to predetermined values and/or trending them over time as illustrated in step 515. That is, the calculated values may be compared to predetermined values and/or monitored over time to assess whether the rate of change of the monitored values is increasing so that a determination may be made as to whether the gearbox has deteriorated to a level that warrants further inspection or, possibly, repair or replacement.

In certain instances, the present SER analysis method may be automatically conducted periodically on an operating gearbox and the results compared to one or more levels such that various alarms signals may be generated to alert the machine operator to an existing condition, or, in certain instance, to automatically undertake protective measures such as shutting down the machine.

Further in accordance with the present technology, the SER analysis method may be extended to include additional indicators. For example, in one optional extension, the ratios of Sideband Energy Ratios (SERs) may be calculated and compared with adjacent mesh harmonics. For example, the ratio SER1× mesh/SER2× mesh may be computed and then trended and/or compared to various predetermined level. Still further, while the present description involves mesh frequencies at 1×, 2×, and 3× the center frequency, higher order mesh frequencies and sidebands may be included.

In yet a further embodiment, a ratio of sums of upper and/or lower sideband amplitudes associated with adjacent harmonics may be calculated directly without including their associated mesh harmonic amplitude. This further embodiment is illustrated in flow chart 600 illustrated in FIG. 6 and is generally similar to flow chart 500 illustrated in FIG. 5 except for the values used to calculate the SER ratio.

Figure 5:
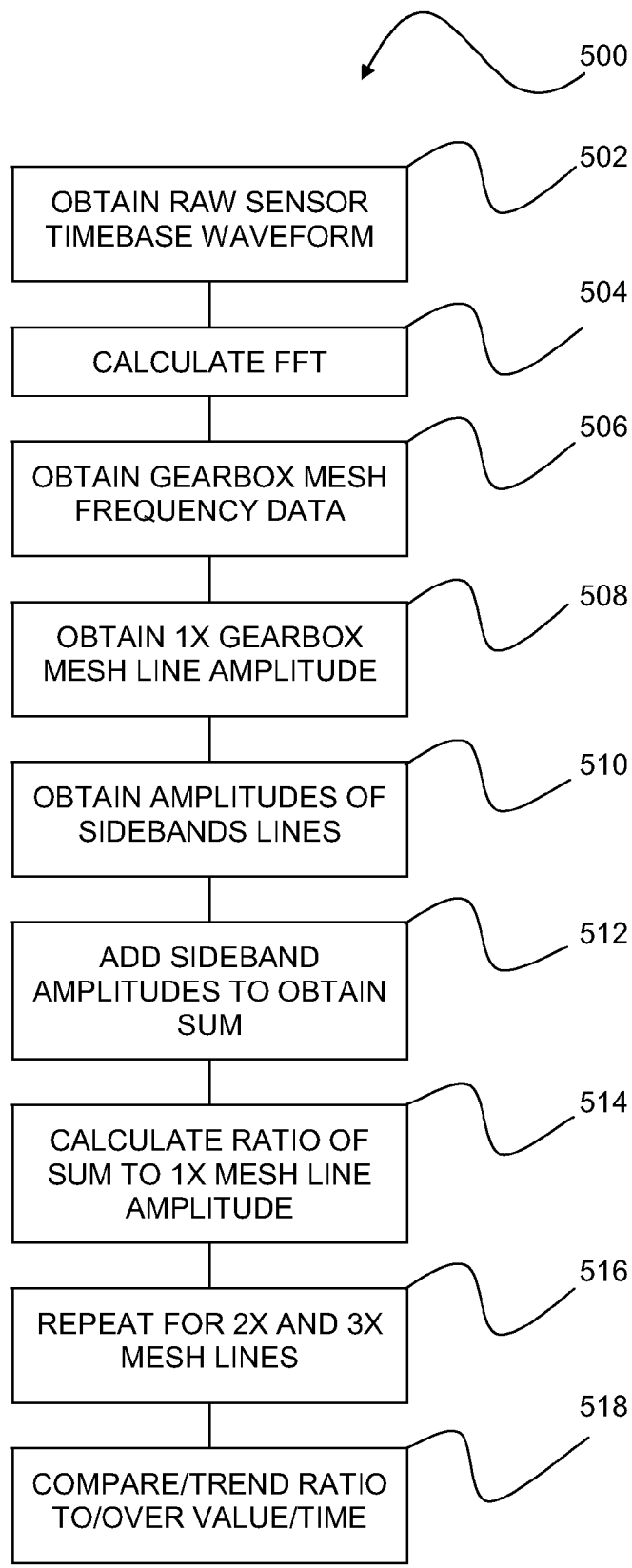
FIG. 5 is a chart of steps conducted in accordance with the preset subject matter to evaluate the test results illustrated in FIGS. 3 and 4 for gearbox deterioration.
Figure 6:
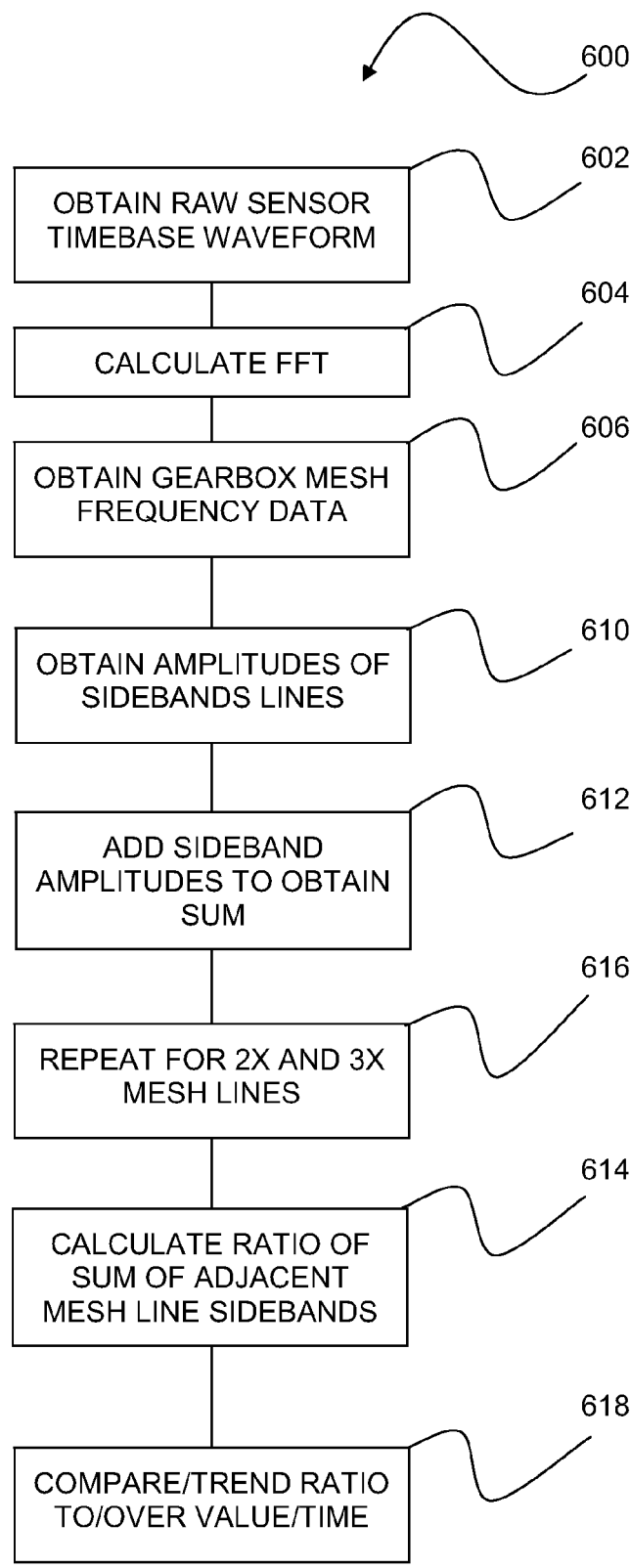
FIG. 6 is a chart of steps conducted in accordance with a further embodiment of the present subject matter to evaluate the test results illustrated in FIGS. 3 and 4 for gearbox deterioration.

In accordance with this further embodiment, at step 602, a waveform derived by monitoring the operation of a gearbox with a transducer is produced in a manner identical to that of step 502 of FIG. 5. Similarly, steps 604, 606, 610, 612, and 618 are identical to those of their corresponding 500 series steps illustrated in FIG. 5.

It will be noted that in this embodiment there is no equivalent of step 508 of the FIG. 5 embodiment as the mesh line amplitude is not used in the calculations for this embodiment. Step 616 follows step 612 in this embodiment so that processing steps 616 necessary to provide sideband amplitudes sums for the 2× and 3× mesh lines are repeated to provide for a newly placed step 614 that performs a ratio calculation similar to step 514 of the FIG. 5 embodiment, but in this instance calculates the ratio of summed sideband amplitudes associated with adjacent harmonics. As with the embodiment illustrated in FIG. 5, sidebands may be detected on both sides, that is, the upper and lower sidebands, of each frequency line, but in this case also summing of just the lower or upper sideband may be employed as each sideband is generally symmetrical around its center frequency.

SERs based on sideband amplitudes alone may then be calculated during the lifetime of the gearbox and gearbox deterioration assessed by comparing the calculated SERs to predetermined values and/or trending them over time as illustrated in step 618 in identical fashion to the comparisons made at step 518 of the FIG. 5 embodiment.

Figure 7:
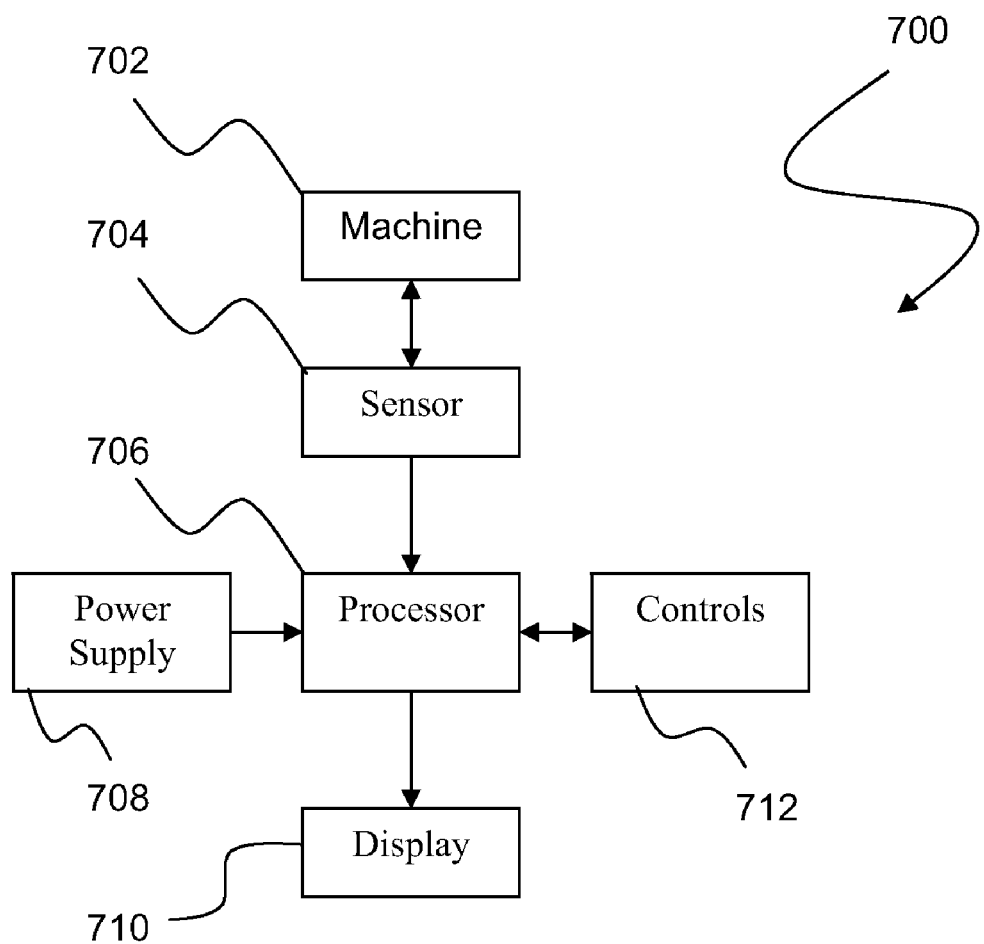
FIG. 7 is a schematic representation of machine health monitoring apparatus in accordance with the present technology.

Referring to FIG. 7, there is illustrated a schematic representation of a machine health monitoring apparatus 700 in accordance with the present technology. As illustrated, machine 702 may correspond to any machine that normally produces some type of vibration during operation. In particular embodiments, the machine may include a gearbox and the vibrations produced may correspond to vibrations resulting from the meshing of gears within the gearbox.

A sensor 704 may be associated with machine 702 in various manners such as being mounted internally within a housing associated with the machine or mounted on an exterior surface of a machine housing. In either instance, the sensor is selected from available sensors capable of producing a signal indicative of machine vibration in particular frequencies ranges. More particularly, sensor 704 may be configured to produce an electrical signal corresponding to the amplitude of harmonic frequencies and associated sideband frequencies produced by an operating machine. In an exemplary embodiment of the present subject matter, sensor 704 may correspond to an accelerometer.

Sensor 704 is configured to supply an electrical signal to processor 706 for evaluation. Processor 706 may receive operating power from power supply 708 and may provide an output on display 710 indicative of results obtain from an evaluation of the signals from sensor 704. Processor 706 may be controlled via control 712 to provide varying evaluations depending on an operator's objectives. Controls 712 may be configured for manual or automatic adjustment via manual controls or via further external processors.

In an exemplary arrangement, an operator may select particular harmonic frequencies and/or their associated sidebands for evaluation. Display 710 may be configured to display images such as those illustrated in FIGS. 1-4, or may simply correspond to, for example, an LED display indicating a relative level of gear damage based on the analysis performed by processor 706.

Still further in additional embodiments, modulation schemes produced in various types of gearboxes may be considered. For example one may consider the modulation produced by planet passage, sun rotation, planet rotation, carrier rotation, and ring rotation in planetary gearboxes.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for assessing deterioration in a machine, comprising:
   calculating the ratio of summed sideband amplitudes to their center harmonic frequency amplitude produced in the operating machine; and,
   evaluating the ratio over at least one of a time period or ratio value.

2. The method of claim 1, wherein the center harmonic frequency corresponds to a first harmonic gear mesh frequency.

3. The method of claim 1, wherein the center harmonic frequency corresponds to a second harmonic gear mesh frequency.

4. The method of claim 1, wherein the center harmonic frequency corresponds to a third harmonic gear mesh frequency.

5. The method of claim 1, wherein the ratio center harmonic is a first predetermined harmonic frequency, further comprising:
   calculating the ratio of summed sideband amplitudes to their center harmonic frequency amplitude produced in an operating gearbox at a harmonic frequency adjacent the first predetermined harmonic frequency;
   calculating a second ratio by dividing the ratio calculated using the first predetermined harmonic by the ratio calculated using the harmonic frequency adjacent the first predetermined harmonic frequency; and,
   evaluating the second ratio over at least one of time or value.

6. The method of claim 5, wherein the first predetermined harmonic frequency corresponds to the first harmonic frequency of the operating apparatus, and wherein the harmonic frequency adjacent the first predetermined harmonic frequency corresponds to the second harmonic frequency of the operating apparatus.

7. The method of claim 5, wherein the first predetermined harmonic frequency corresponds to the second harmonic frequency of the operating apparatus, and wherein the harmonic frequency adjacent the second predetermined harmonic frequency corresponds to the third harmonic frequency of the operating apparatus.

8. The method of claim 1, further comprising:
   obtaining sensor timebase waveforms; and,
   calculating a Fast Fourier Transform for the waveforms.

9. The method of claim 1, wherein summed sideband amplitudes comprise the sum of the amplitudes of sidebands on both sides of their center harmonic frequency.

10. The method of claim 1, further comprising:
    monitoring the ratio over a predetermined period of time; and,
    comparing the ratio to predetermined values.

11. The method of claim 1, further comprising:
    monitoring the ratio over a predetermined period of time; and,
    comparing the rate of change of the ratio to predetermined values.

12. A system for assessing deterioration in a machine, comprising:
    means for calculating the ratio of summed sideband amplitudes associated with first and second predetermined adjacent mesh harmonics produced in the operating machine;
    means for evaluating the ratio over at least one of a time period or ratio value; and,
    means for displaying results of the evaluation.

13. The system of claim 12, wherein the summed sideband amplitudes are associated with the first and second mesh harmonics.

14. The system of claim 12, wherein the summed sideband amplitudes are associated with the second and third mesh harmonics.

15. The system of claim 12, wherein the summed sideband amplitudes comprise the sum of sidebands on both sides of their associated mesh harmonic.

* * * * *